United States Patent
Stockinger et al.

[11] 3,958,885
[45] May 25, 1976

[54] OPTICAL SURVEYING APPARATUS, SUCH AS TRANSIT, WITH ARTIFICIAL LIGHT SCALE ILLUMINATING SYSTEM

[75] Inventors: Alfred Stockinger, Germering; Joachim Mainka, Furstenfeldbruck, both of Germany

[73] Assignee: Wild Heerbrugg Aktiengesellschaft, Heerbrugg, Switzerland

[22] Filed: May 12, 1975

[21] Appl. No.: 576,655

Related U.S. Application Data

[63] Continuation of Ser. No. 393,645, Aug. 31, 1973, abandoned.

[30] Foreign Application Priority Data

Sept. 5, 1972  Germany............................ 2243509

[52] U.S. Cl................................ 356/139; 356/147; 116/129 P
[51] Int. Cl.²............................................. G01C 1/06
[58] Field of Search ............ 356/20, 139, 140, 147; 116/124 A, 124.4, 129 P, DIG. 21, DIG. 31, DIG. 36, DIG. 33

[56] References Cited
UNITED STATES PATENTS

| | | | |
|---|---|---|---|
| 3,034,709 | 5/1962 | Batori | 356/140 |
| 3,382,756 | 5/1968 | Schneider et al. | 356/139 |
| 3,428,021 | 2/1969 | Kuhl et al. | 116/124.4 |
| 3,433,571 | 3/1969 | Brunson | 356/139 |

OTHER PUBLICATIONS

GE Solid State Lamp Bulletin, 3-7041.

*Primary Examiner*—John K. Corbin
*Assistant Examiner*—Richard A. Rosenberger
*Attorney, Agent, or Firm*—Flynn and Frishauf

[57] ABSTRACT

A light emitting diode is located beneath a glass scale carrier, one for each scale (azimuth and elevation), emitting essentially monochromatic light, which penetrates through the glass scale; the scale is observed through an optical system. The optical system for viewing of the scale is located on a carrier secured in the telescope housing; the light emitting diodes are powered by a battery secured in the housing, which energizes a timer, such as R/C circuit settable for normal observation times, for example about thirty seconds.

10 Claims, 2 Drawing Figures

U.S. Patent    May 25, 1976    3,958,885
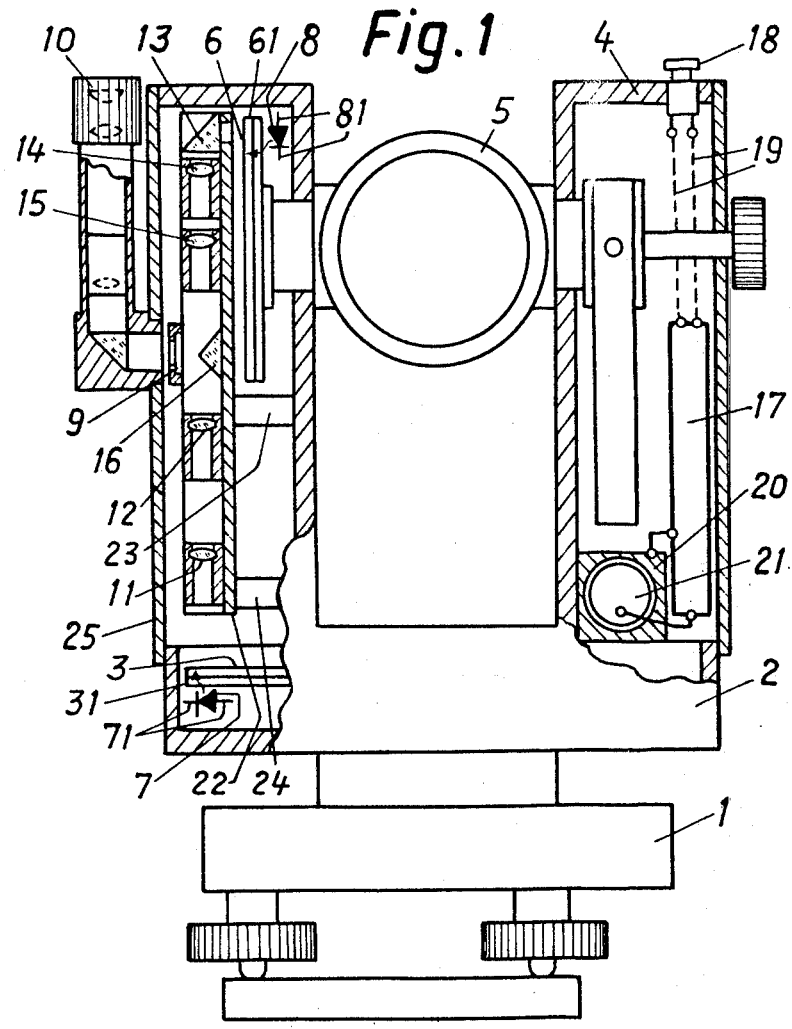
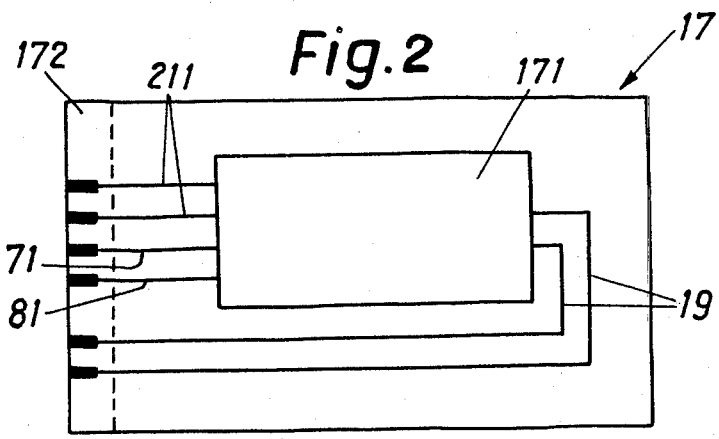

OPTICAL SURVEYING APPARATUS, SUCH AS TRANSIT, WITH ARTIFICIAL LIGHT SCALE ILLUMINATING SYSTEM

This is a continuation of application Ser. No. 393,645, filed Aug. 31, 1973, now abandoned.

The present invention relates to an optical surveying instrument and more particularly to a transit with artificial light sources to illuminate the scales of the transit.

Various surveying instruments use specially illuminated scales. Transits, for example, which have scales to measure azimuth and elevation include circumferential scales or sector scales. Usually these scales are read under ambient light conditions, that is, daylight is used for their illumination. Either direct illumination is used, or a special directing optics is provided. Difficulties arise since the illumination of the scales depends much on weather, time of the day, orientation, and place of use. Greatly different illumination intensities are thus obtained. Modern precision transits, particularly those utilizing glass scales for angular reading may use complicated reading optics. In order to provide sufficient illumination, directing mirrors or lenses must be so arranged that a maximum of light is collected and applied to the scale. Upon slewing of the instrument to a new target, the light conditions frequently change and, upon each measurement, the optics for scale illumination must be readjusted for optimum illumination. This complicates the use of the apparatus and is comparatively time consuming. Manual readjustment of light directing optics, further, may interfere with the setting of the surveying instrument, thus detracting from accuracy of measurement.

It has previously been proposed to provide special illumination devices for transits, and similar surveying instruments. The handling of a collecting mirror, or similar light directing optics is no longer necessary, but it has been found that the light sources previously used did not provide satisfactory illumination. Using an incandescent lamp as a light source results in comparatively great heat generation, which heats the instrument unevenly, resulting in errors in measurement due to differential expansion of the instrument. Using radioactive means as light sources does not have these disadvantages; for sufficient illumination, however, excessive radiation would result. Some apparatus has been proposed to use beta rays as a light source. They have low illumination intensity and are not suitable for portable surveying instruments. Such light sources have only restricted applicability, principally in the military field.

It is an object of the present invention to provide a surveying instrument which carries its own light source for a scale reading and in which the disadvantages of known systems have been avoided.

SUBJECT MATTER OF THE PRESENT INVENTION

Briefly, semi-conductor diodes are used to illuminate the scales. Such semi-conductor diodes, known usually as light emitting diodes (LED) provide essentially monochromatic light. The are arranged, in accordance with the feature of the invention, to illuminate the reading position of a scale, each. LEDs do not generate heat upon emission of light. The luminescent efficiency (Lumens per Watt-ln/W is much better than in incandescent lamps. Arranging one diode, each, with a reading position provides adequate illumination for every scale. The LEDs require only little power, while emitting light in the visible range. A LED may be used, for example, which supplies light at a wave length of $650.10^{-9}$ m (nm). The light is essentially monochromatic, that is, the frequency spread for the light emission of such a LED is, for example, about $40.10^{-9}$ m (nm) deviation from center. The power requirement of such a LED is $8.10^{-3}$ Watt (mW), while providing sufficient light for reading of a scale of a transit. The light density, in candelas/m$^2$ – cd/m$^2$ – is adequate. At a battery capacity of 1 ampere hour, which is suitable for use with a portable transit, the battery would provide power for approximately 120 working days, under usual surveying conditions.

Incandescent lamps with similar light density (cd/m$^2$) have substantially higher power requirements, and thus utilize batteries to a much greater extent, which substantially increases the cost of use of the instrument, while additionally interfering with ease of surveying. LEDs have the advantage with respect to beta radiators to provide a much higher illumination intensity (cd/m$^2$). Incandescent lamps as well as beta radiators are not monochromatic. Much higher requirements therefore are placed on the viewing optics than when LEDs are used. The long life of LEDs is also of advantage. The usual type of modern LEDs have a half-light life of about 100 years; considering that the average surveying instrument may have an effective economic life of about 10 years, it will be apparent that using an LED throughout the life of the transit will not result in measureable decrease in illumination intensity. During the life of the instrument, therefore, it is not necessary to replace the LEDs. This is in specific contrast to the use of incandescent lamps in surveying instruments, which are frequently run at over voltage to obtain a sufficient light intensity and therefore require frequent replacement during the life of the instrument.

Utilizing LEDs for illumination has the additional advantage that the eye of the observer will always be supplied with a reading image of the same color content and of the same light intensity. This substantially contributes to accuracy in reading and insures that any estimates of interscale distances can be easily carried out, and without tiring. The constant illumination conditions — color and intensity — counteract the tendency of the eye to tire. Monochromatic light, as developed by the LED additionally provides for good contrast, which is one of the conditions of high accuracy in scale reading.

The invention will be described by way of example with reference to the accompanying drawings, wherein:

FIG. 1 is a fragmentary longitudinal sectional view through a transit, in which all parts not necessary for an understanding of the invention are illustrated only schematically and without detail; and FIG. 2 is a schematic circuit diagram of the electrical portion of the scale reading apparatus of FIG. 1.

A tripod, schematically indicated at 1, locates the transit, the upper instrument portion 2 of which is rotatable about a vertical axis. The instrument has a horizontal scale 3 which can rotate with respect to the tripod support 1 together with the instrument 2. The telescope carrier 4, which is part of the upper instrument part 2, secures the telescope 5, swingable over a tilt axis. The horizontal tilt or elevation axis, as well as the vertical swing azimuth axis are, each, indicated by chain dotted lines. The vertical scale 6 is secured to the horizontal tilt, or elevation axis. The vertical scale 6 tilts together with the orientation of telescope 5.

Horizontal scale 3 has a reading position 31; vertical scale 6 has a reading position 61. A light emitting diode 7, 8 respectively is located beneath, or behind the scale 3, 6, respectively at the reading positions 31, 61, respectively. The main direction of light emission of the LED is applied, at right angles, through the scale 3 or 6 respectively, and then extends into the reading optic. The two reading positions 31, 61 provide an intermediate image in the plane of plate 9, which may be a ground glass, and which can be imaged through an angled reading microscope 10.

The horizontal scale 3 and the vertical scale 6, each, are made of glass. The LEDs 7, 8 are located behind the reading positions 31, 61, so that they direct their light through the glass. The LEDs can be located immediately behind the reading positions, but it is also possible to locate them elsewhere and utilize mirrors, lenses, or light guides to transmit the light from the LED, wherever located, to the reading position. Such light guides, or optics, may be part of the LED itself. The LEDs are so small that they can, usually, be mounted directly where needed and since they do not emit any appreciable heat they can be located as desired, without regard to ventilation.

The radiation, in the visible spectrum, derived from the LEDs 7, 8 is monochromatic. It is desirable that the optics of the scale reading system is matched to the wave length of the light emitted from the LEDs and that monochromatic lenses are used matched to this wave length. Monochromatic lenses are much simpler and much cheaper in manufacture than lenses or lens systems which provide perfect imaging throughout a substantial range of wave lengths. It has, in the past, been necessary to utilize achromatic optical systems for the scale reading systems; in contrast, the optics to be used in the present invention require only simple, non-cemented lenses. FIG. 1 illustrates such simple optics, which includes imaging lenses 11, 12 imaging the reading position 31. The light rays passing through lenses 11, 12 are reflected by a prism 16 on plane 9. The elevation scale 6 includes an optical system having a prism 13, and lenses 14, 15 to image the reading position 61 on plane 9, after deflection by prism 16. The two optical paths are indicated by chain dotted lines. The outer surface of the prism 16 reflects the optical paths, and images the reading positions, next to each other, on ground glass 9, for viewing through microscope 10.

The entire imaging optics 11, 12, 13, 14, 15, 16 and 9 for both reading scales 3, 6 is located within the housing 4 and the telescope 5. The entire optical system can be secured on a single support plate 22. This compact construction has the additional advantage that the optics secured to the single support plate 22 can be preadjusted before being assembled into the transit. Support plate 22 is secured to bars 23, 14, formed in the housing 4 and the telescope 5. It is a simple matter to assemble the carrier plate 22 in the housing 4; likewise it can be easily disassembled therefrom if repair, or subsequent adjusting or collimating, after years in operation, should be necessary.

In actual assembly, the optics in carrier plate 22 are first assembled in the apparatus; thereafter the viewing microscope is assembled, to permit reading of the imaging or marks at reading positions points 31, 61. The microscope does not change the adjustment position of the imaging plane, defined by ground glass 9, and it is secured independently from the carrier plate 22 in the housing 4, for example at the outer wall 25 thereof.

It is desirable to operate the LED only when actually necessary, and to this end a circuit is provided which included a timing element. Referring to FIG. 2, a timing switch 171 connects the LEDs to a battery supply. Timing switch 171 includes electronic elements which are all located on a base plate 17, for example in the form of a printed circuit and printed circuit carrier plate. The printed circuit is located in the housing 4, at the side remote from the microscope. A battery 21 is located in a chamber 20 formed in the housing 4, adjacent to the printed circuit plate 17. The printed circuit plate 17 is formed at one end with a terminal bar 172, on which the various terminals to connect with the battery, timing switch, LEDs as well as the starter, are arranged. A starter button 18 (FIG. 1) is located on the housing, to connect over line 19 with the timing switch 171, upon depression of the starter switch by the operator. A timing circuit such as, for example R/C circuit, is located on the printed circuit board 17 which, upon depression of button 18, connects the LEDs over line 71, 81 to the battery. The operator now can read the scale readings on the reading positions 31, 61. The illumination time is determined by the electrical parameters of the R/C circuit and timing switch 171. An average time for reading, for example, is about 30 seconds to provide for precise reading of the scale. By changing the resistance of the R/C circuit to change the timing of illumination, illumination, therefore, of the LEDs extends for the changed timing period, for example, about 40 seconds, upon momentary depression of button 18. Thereafter, the timing switch disconnects the LEDs. The time between on and off conditions of the LEDs can be set off also in other ways, and manual on/off switches can be provided although an automatic timing switch is preferred. Lines 211 (FIG. 2) form the connection between timing switch 171 and battery 21. The printed circuit of the timing switch 171 on board 17 can be removed easily from the housing 4, since the board 17 is a plug-in board with plug-in terminals. The battery housing 20, in which battery 21 is inserted, is hermetically sealed at all sides and is accessable only from the outside for replacement of the battery. As seen in FIG. 1, battery housing 20 is located in the lower portion of the right side of the housing forming the support or carrier for the telescope 5, and can be opened towards the objective side of the telescope. The battery 21 can thus be easily replaced, that is, removed and a new one reinserted. Contacting is provided, in known manner, upon insertion of the battery of the housing.

Using LEDs provides sufficient illumination, so that daylight illumination is no longer necessary. The entire optical instruments can be constructed simply, and the reading system sealed, to prevent contamination by dust, or moisture. The manufacturing costs are decreased and use is simplified.

Various changes and modifications may be made within the scope of the inventive concept.

LEDs are available which provide radiation in various color hues. The LED 7, which illuminates the azimuth scale may, therefore, have a different color radiation than the LED 8 which illuminates the elevation scale, thus further facilitating differentiation between the scales and accuracy of reading. The lenses 11,' 12 and 14, 15, then will be matched to the respective light emission from the respective LED; prism 16 would, however, have to have a band width sufficient to accommodate both LEDs, or have the face thereof matched to the color of light impinging thereon.

We claim:

1. An optical surveying apparatus such as a transit, or the like, having a housing (4), optical sighting apparatus (5) secured to the housing (4), observation means including read-out positions and scales (3, 6) coupled to the sighting apparatus and located within the housing, a battery (21), scale illumination means connected to the battery to illuminate the scales, and an optical system (9, 10; 11, 12; 13, 14, 15) located in an optical path and comprising reading optics including an ocular to permit observation of the scales at the read-out positions, wherein:

the scale illumination means is entirely included in the housing and comprises an individual light-emitting semiconductor diode (LED) (7, 8) associated with each of the reading positions, the light-emitting diodes emitting monochromatic light in the visible range, and each located in the housing immediately adjacent the respective scale to individually provide light to the respective scale at the respective individual read-out positions for the orientation of the sighting apparatus;

and wherein the optical path is entirely located within the housing starting from the respective light emitting diode adjacent the respective scale and terminating at the ocular, and the optics of the optical system in the optical path between the respective scale and the ocular are monochromatic.

2. Apparatus according to claim 1, wherein the scales (3, 6) are made of glass, and the light from the LEDs (7, 8) is applied to the glass directly from behind at the reading positions thereof.

3. Apparatus according to claim 1, wherein the sighting apparatus comprises a structural support (4), said support forming a battery chamber (20), the battery (21) being received in the chamber, said chamber being entirely closed to the inside of the structural support and accessible only from the outside thereof.

4. Apparatus according to claim 1, further comprising a common carrier means (22) supporting the elements of the reading optics in position in the apparatus.

5. Apparatus according to claim 1, further comprising an electronic timing switch (171) connected between the battery (21) and the LEDs, the timing switch providing an ON time and connecting the battery to the LEDs during the ON time of the timing switch to provide limited energization time of the LED.

6. Apparatus according to claim 5, wherein the apparatus is a transit having a telescope, the timing circuit is formed as a printed circuit, the printed circuit including plug-in terminals, and being plugged in matching terminals located in the housing for the transit.

7. An optical surveying instrument, comprising a first member which carries a measuring scale (3, 6), and a second member (31, 61) which carries an index mark forming a reading position which can be viewed in a common field of view with the scale to provide a reading of the relative position of the first and second members, the first and second members being movable relative to one another when the instrument is in use in a sense such that in the said common field of view relative movement appears to take place between the index mark and the measuring scale in a direction along the measuring scale;

a light emitting semiconductor diode for connection with a source of electrical energy for energizing the diode to emit essentially monochromatic visible light, the diode being positioned adjacent the scale so that when it is energized, light emitted thereby illuminates that region of the measuring scale which can be viewed in the said common field of view when the instrument is in use;

an optical viewing system including an ocular system for said scale and mark comprising at least one lens element, the element, or elements of said system having monochromatic light transmission characteristics to transmit the monochromatic light emitted by the semiconductor light emitting diode;

and a closed housing enclosing said measuring scale, said semiconductor diode, and said optical viewing system, the optical viewing system being a light path originating at said light-emitting semiconductor diode, within the housing, and extending to said ocular system.

8. An optical surveying instrument according to claim 7, further comprising an electronic timing switch (171) connected between the battery (21) and the LEDs, the timing switch providing an ON time and connecting the battery to the LEDs during the ON time of the timing switch to provide limited energization time of the LED.

9. Apparatus according to claim 1, wherein said housing is completely closed and provides only a single optically transparent region for the ocular.

10. Instrument according to claim 7, wherein said housing is completely closed and provides only a single optically transparent region for the ocular system.

* * * * *